(12) United States Patent
Yan et al.

(10) Patent No.: US 7,494,587 B2
(45) Date of Patent: Feb. 24, 2009

(54) DEVICE HAVING MULTI-PORES MAGNETO-RUBBER FILTER

(75) Inventors: Biing-Hwa Yan, Jhongli (TW);
Hsinn-Jyh Tzeng, Taipei (TW)

(73) Assignee: National Central University, Jhongli (TW)

( * ) Notice: Subject to any disclaimer, the term of this patent is extended or adjusted under 35 U.S.C. 154(b) by 510 days.

(21) Appl. No.: 11/363,033

(22) Filed: Feb. 28, 2006

(65) Prior Publication Data
US 2007/0163936 A1    Jul. 19, 2007

(30) Foreign Application Priority Data
Jan. 13, 2006  (TW) .............. 95101311 A (51) Int. Cl.
*B01D 35/06* (2006.01)
*C02F 1/48* (2006.01)

(52) U.S. Cl. ............ 210/222; 210/223; 210/489; 210/498; 210/500.25; 210/510.1; 55/486

(58) Field of Classification Search ........ 210/222, 210/223, 489, 498, 500.25, 510.1; 55/486
See application file for complete search history.

(56) References Cited

U.S. PATENT DOCUMENTS

| 1,663,298 | A | * | 3/1928 | Geer et al. ............ 210/498 |
| 2,959,832 | A | * | 11/1960 | Baermann ............. 210/222 |
| 6,016,036 | A | | 1/2000 | Brailove ............. 315/111.71 |
| 2007/0095738 | A1 | * | 5/2007 | Zhang ............... 210/222 |

* cited by examiner

Primary Examiner—David A Reifsnyder
(74) Attorney, Agent, or Firm—Troxell Law Office PLLC (57) ABSTRACT

A filter is made of a rubber having magnetism to attract metal paricles in a fluid for filtering impurities. The filter can be used in a hydraulic transmission system or even an air filter used in a semiconductor production.

9 Claims, 11 Drawing Sheets

DEVICE HAVING MULTI-PORES MAGNETO-RUBBER FILTER

FIELD OF THE INVENTION

The present invention relates to a filter; more particularly, relates to obtaining a rubber having a plurality of magnetic filtering holes to attract metal particles in a fluid through magnetism.

DESCRIPTION OF THE RELATED ARTS

A first prior art, "Magnetic filter device", is proclaimed in Taiwan, where a filter made of a ferromagnet is deposed in a container with a fluid inlet and a fluid outlet; permanent magnets for magnetizing the filter are deposed oppositely to one another at the outside surface of the container with magnetic lines of force approximately perpendicular to the flow path in the container. Therein, the prior art is characterized in that the period the fluid passes through the container is more than 0.5 second and less then 1.5 seconds; and the interval (L) between each two permanent magnets, and the density (B) of remaining magnetic lines of force of the permanent magnets are conformed to the following formula: $B \times 100 \leq L \leq B \times 250$.

A second prior art proclaimed in Taiwan is called "Magnetic filter for ion source", comprising a housing for defining a plasma closed room having a plasma with ion obtained from an ionized material, where the housing has at least a two-dimensional wall with long bar holes formed; the ion beam is extracted by the plasma through the bar holes; the bar holes are substantially parallel to each other and also to a first axle on the two-dimensional wall; a second axle on the two-dimensional wall is substantially perpendicular to the first axle too. Therein, the magnetic filter comprises at least a bar-shaped magnet deposed in the plasma closed room to divide it into a first zone and a second zone; and, the direction of the bar-shaped magnet has an angle to the second axle and the bar-shaped magnet is deposed on the generally parallel two-dimensional walls.

A third prior art proclaimed in Taiwan is called, "Magnetic filter device for engine oil", where an oil inlet and an oil outlet are set at the shell of the filter; a horn-shaped filter device is deposed in the shell having a filter paper, a metal mesh, a top plate and a bottom plate; the filter device separates the oil inlet and the oil outlet; a magnetic filter device is deposed at a place localized by the metal mesh to cover the oil inlet; an elastic element is deposed between the top plate of the filter device and the inner top of the shell to fix the filter device in the shell; and, after the oil enters into the shell from the oil inlet, the oil passes through the filter paper and the metal mesh and is filtered by the magnetic filter device to be flowed out through the oil outlet while metal particles in the oil are attracted by the magnetic filter device. Therein, the prior art is characterized in that the magnetic filter device comprises a base having a trapezoid on top, a magnet having a central hole to be fixed to the trapezoid, and a cap covering on top of the magnet; the trapezoid is connected with a plate and a tortuous member; proper hollows appear at two sides between the trapezoid and the tortuous member; the bottom rim of the cap is lower than the bottom rim of the magnet and is fixed to the trapezoid; with the above structure, the place localized by the metal mesh leaves more room for the flowing-out of the oil through the oil outlet; the depression between the cap and the magnet attracts metal particles effectively; and, the base is deposed in a hollow screw at the oil outlet.

A fourth prior art proclaimed in Taiwan is called, "Enhanced filter device for air filter", comprising a positioning frame, a metal mesh and a fiber filter plate. Therein, the prior art is characterized in that a non-woven fabric is deposed at an air inlet to enhance the filtering effect; the non-woven fabric is processed with a nano-scaled far infrared light so that the non-woven fabric emits far infrared light to mince and activate the air.

Although the above first, second and third prior arts filter metal particles, their structures are complex with limited applications. Regarding the fourth prior art, it filters dust but not metal particles. In addition, traditional filter device is selected by its filter mesh size. When the mesh size is smaller than the metal particles, metal particles are filtered yet the lifetime of the filter device is shortened and uneconomical owing to the lot of dusts and particles left on the filter device. On the contrary, when the mesh size is bigger than the metal particles, metal particles are not effectively filtered and the lifetime of the whole equipment is affected. Hence, the prior arts do not fulfill users' requests on actual use.

SUMMARY OF THE INVENTION

The main purpose of the present invention is to filter out tiny metal particles and iron filings for prolonging the lifetime of a machine with a simple and easily assembled structure applied to a filtering system.

To achieve the above purpose, the present invention is a device having a multi-pores magneto-rubber filter, comprising at least one magneto-rubber filter having a multi-pores structure, where the magneto-rubber filter having the multi-pores structure is made of a rubber and the rubber is made by mixing and pressing a polymer and magnetic iron powders of various sizes; and the polymer is a synthetic rubber or a compound rubber. Accordingly, novel device having a multi-pores magneto-rubber filter is obtained.

BRIEF DESCRIPTIONS OF THE DRAWINGS

The present invention will be better understood from the following detailed descriptions of the preferred embodiments according to the present invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1A:
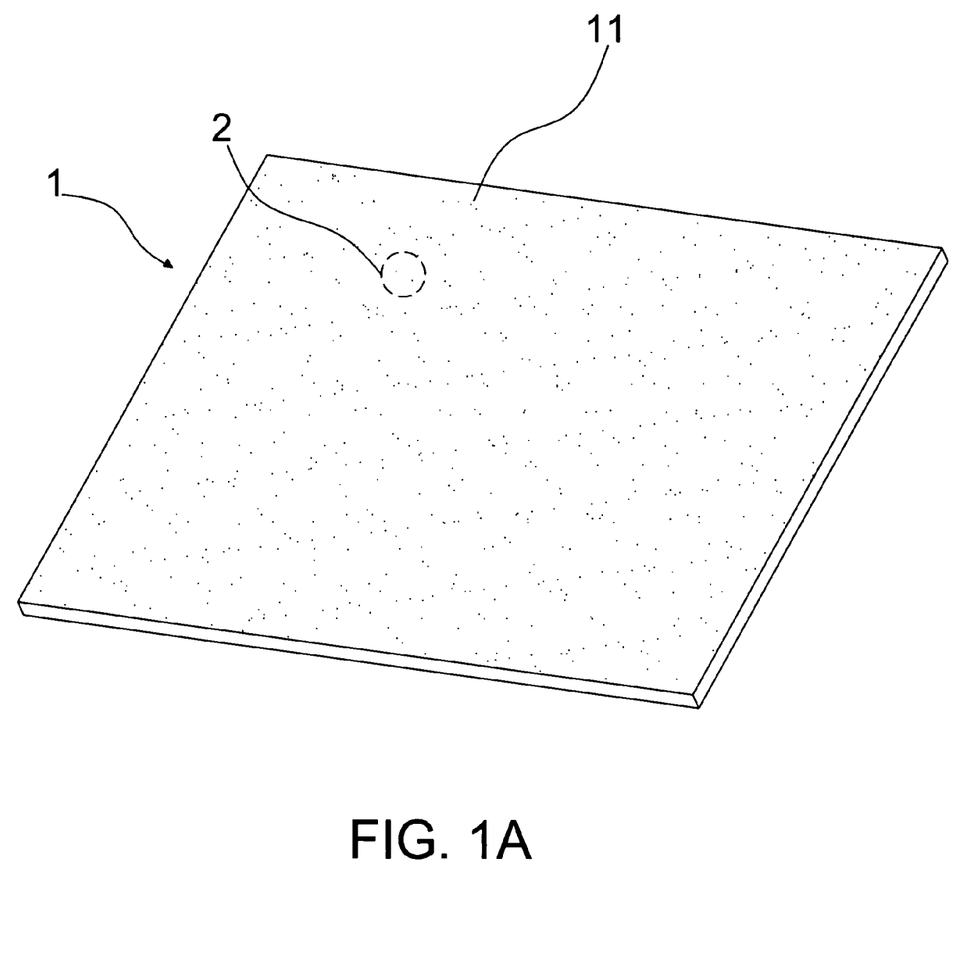
FIG. 1A is a structural view showing a layer of the rubber filter according to the present invention.
Figure 1B:
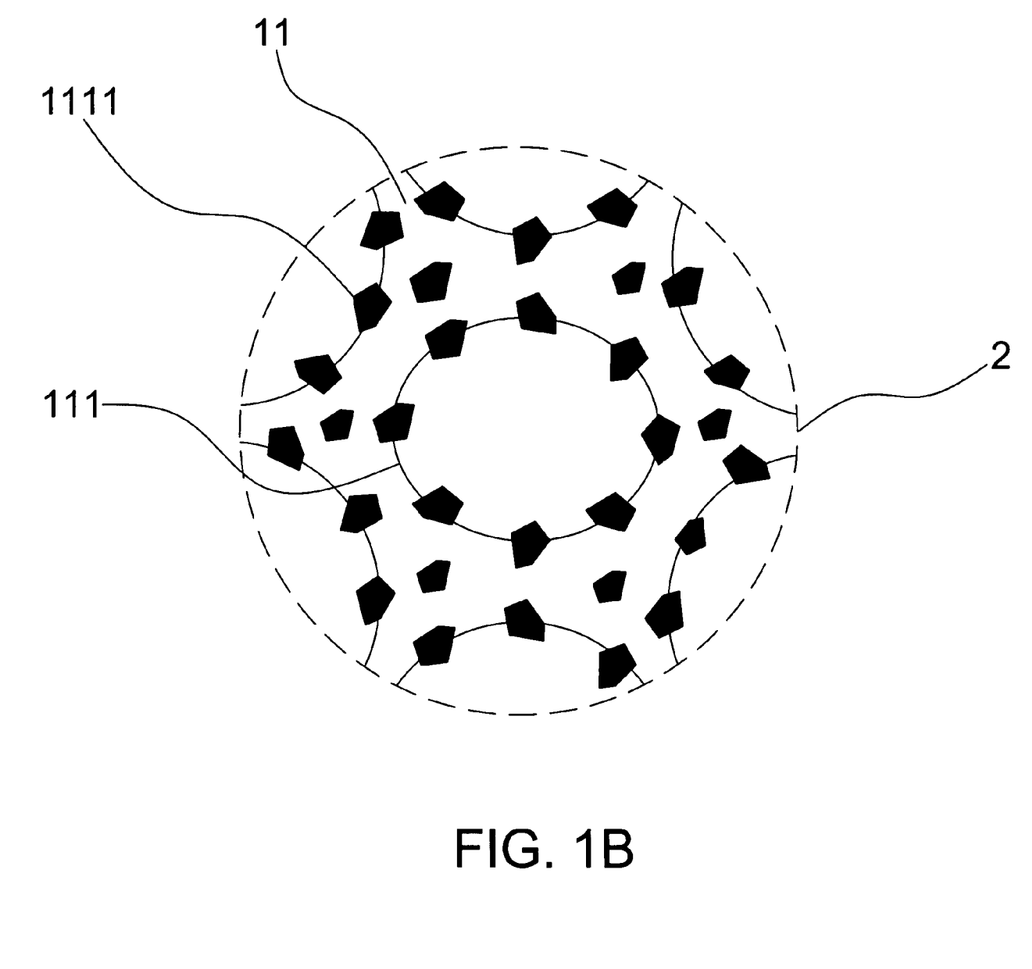
FIG. 1B is a view showing a partial enlargement.
Figure 1C:
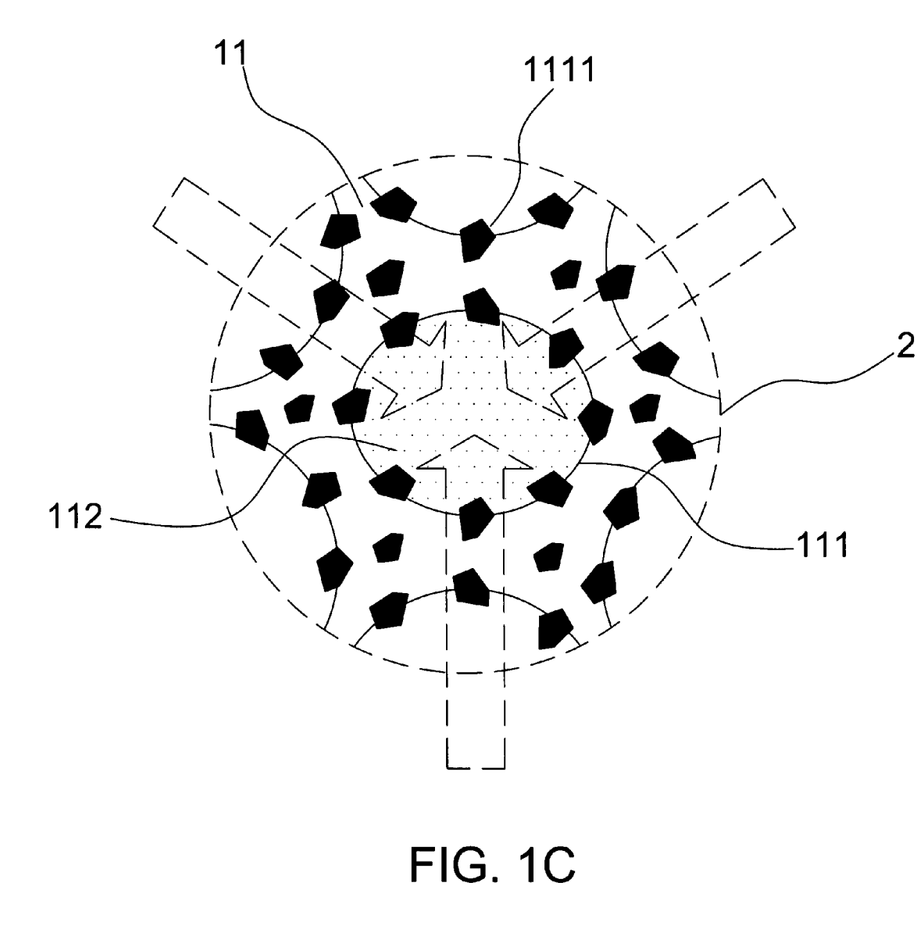
FIG. 1C is a view showing a state of filtering.

Please refer to FIG. 1A till FIG. 1C which are a structural view showing a layer of the rubber filter, a view showing a partial enlargement and a view showing a state of filtering according to a preferred embodiment of the present invention. As shown in the figures, the present invention is a device having a multi-pores magneto-rubber filter, comprising a layer of a magneto-rubber filter 1 with a multi-pores structure. The magneto-rubber filter 1 with a multi-pores structure comprises a rubber 11 having a plurality of magnetic filtering holes 111 (whose structure is shown in a view of a partial enlargement 2). The rubber 11 having the magnetic filtering holes 111 is made of a polymer and magnetic iron powders of various sizes above 0.1 micrometer (μm) by being mixed and pressed, so that the magneto-rubber filter 1 with a multi-pores structure attracts metal particles 112 (such as tiny metal dust or iron filings) of sizes above 0.01 μm. Hence, a fluid having metal particles 112 is filtered through a magneto-rubber filter 1 according to the present invention to attract metal particles 112 in the fluid with the magnetism (as shown in FIG. 1C) to obtain a function of filtering. Therein, the polymer is a synthetic rubber, such as a chloroprene, an ethylene propylene diene monomer or a polyurethane resin. Or, the polymer is a compound rubber, such as a styrene butadiene styrene block polymer, a styrene-ethylene-butylene-styrene copolymer compound or a thermoplastic polyolefin. The above polymers have characteristics of aging resistance, oil resistance and elastic-plasticity.

Figure 2A:
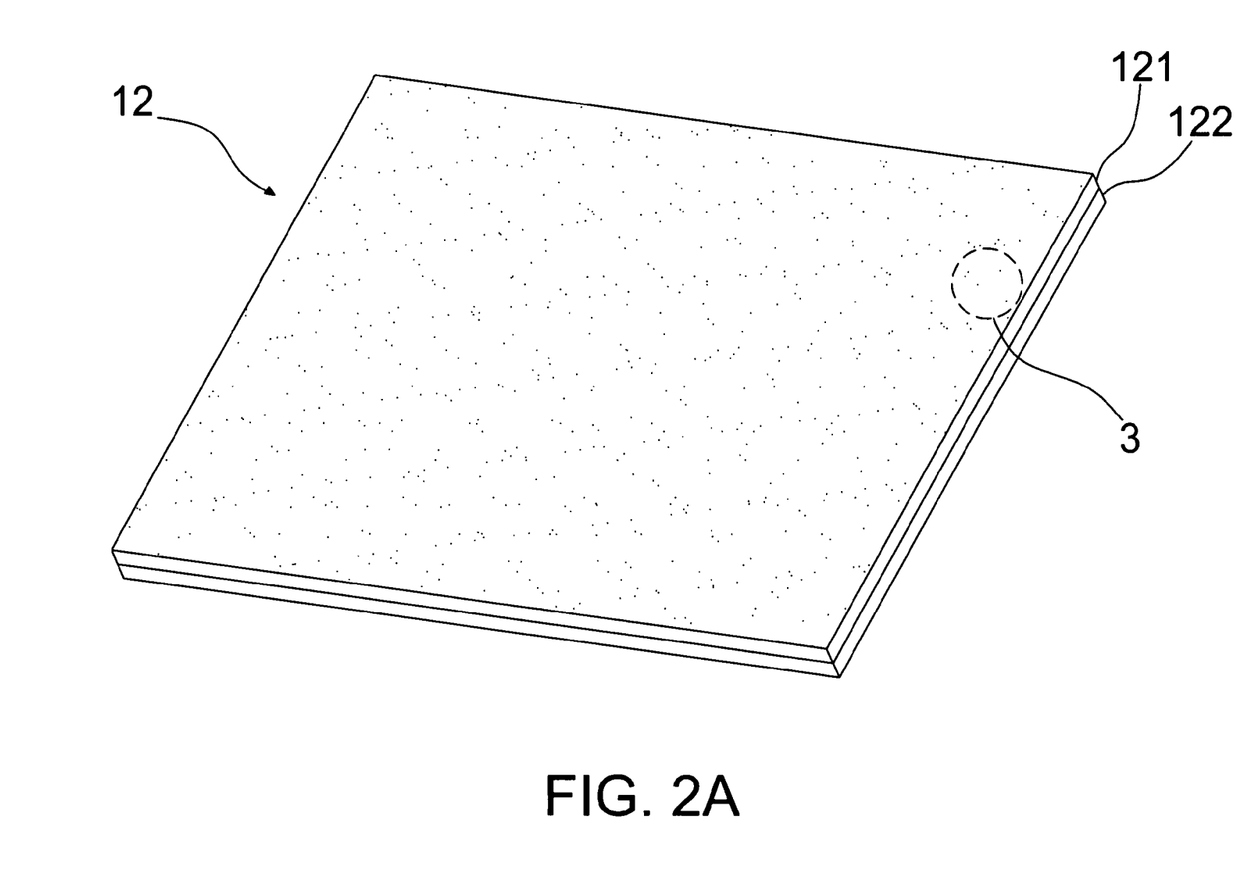
FIG. 2A is a view showing double layers of the rubber filter.
Figure 2B:
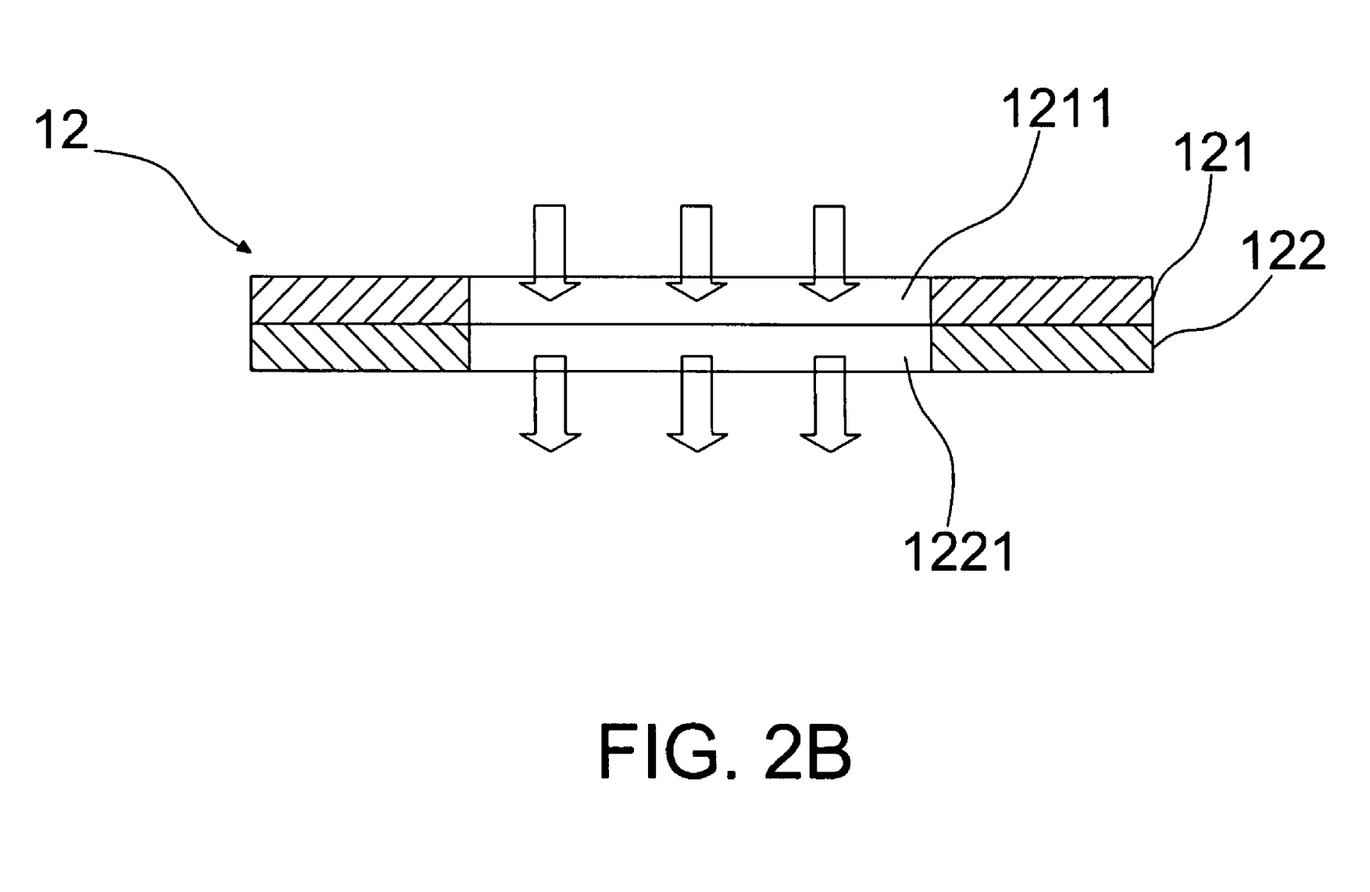
FIG. 2B is an enlarged cross-sectional view of the double layers having a coherent arrangement.
Figure 2C:
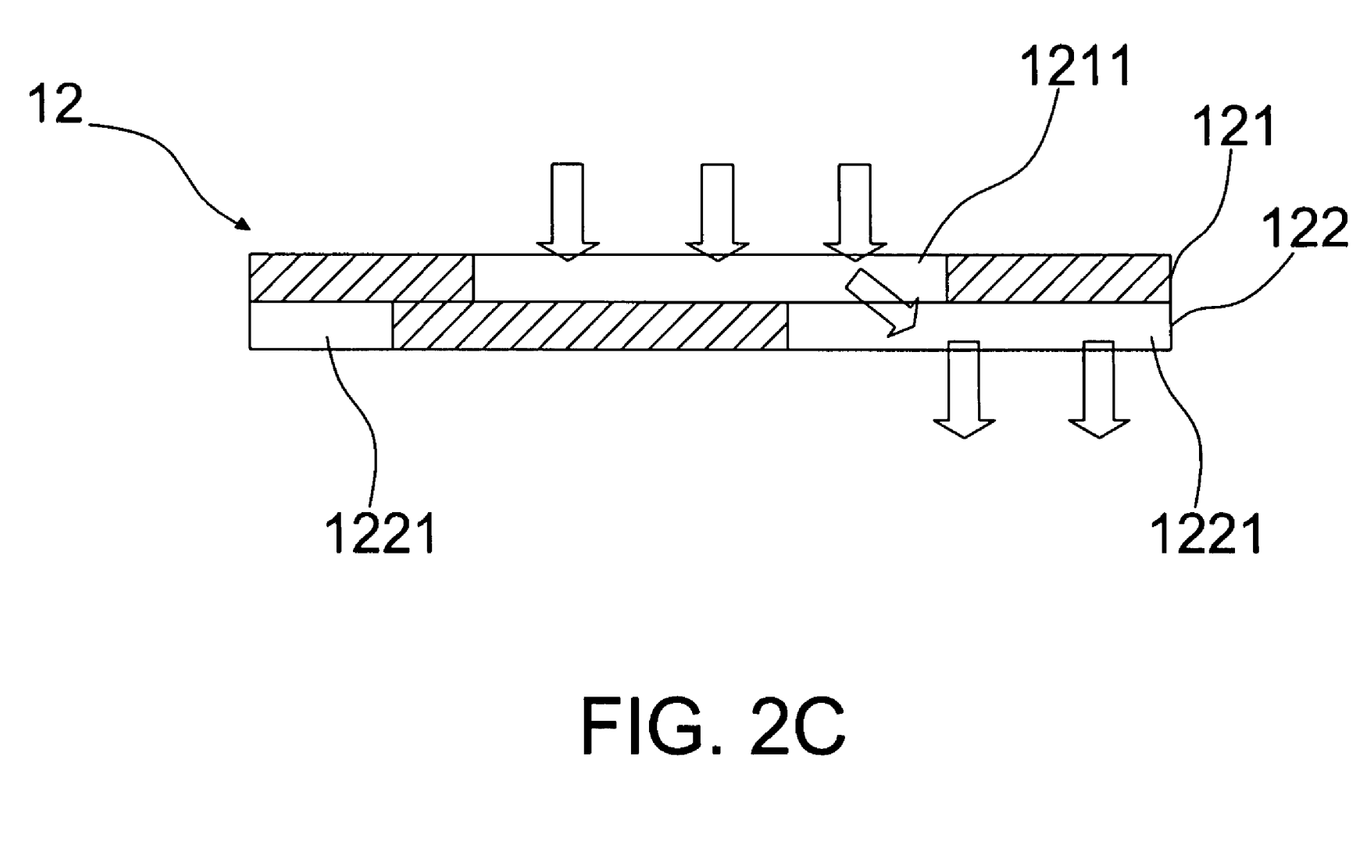
FIG. 2C is an enlarged cross-sectional view of the double layers having an incoherent arrangement.

Please refer to FIG. 2A till FIG. 2C which are a view showing double layers of the rubber filter and enlarged cross-sectional views of the double layers having an coherent arrangement and having an incoherent arrangement. As shown in the figures, a rubber filter is stacked with another rubber filter to obtain double layers of magneto-rubber filter 12 having a multi-pores structure, which are a first layer 121 and a second layer 122. As shown in views of the enlarged cross-sectional views of the double layers, the magnetic filtering holes 1211 of the first layer 121 and the magnetic filtering holes 1221 of the second layer 122 have a coherent arrangement (as shown in FIG. 2B) or an incoherent arrangement (as shown in FIG. 2C) to enhance the filtering ability of the double layers of magneto-rubber filter 12 after the stacking. As a result, the present invention is stacked with at least one layer of a magneto-rubber filter having a multi-pores structure.

Figure 3:
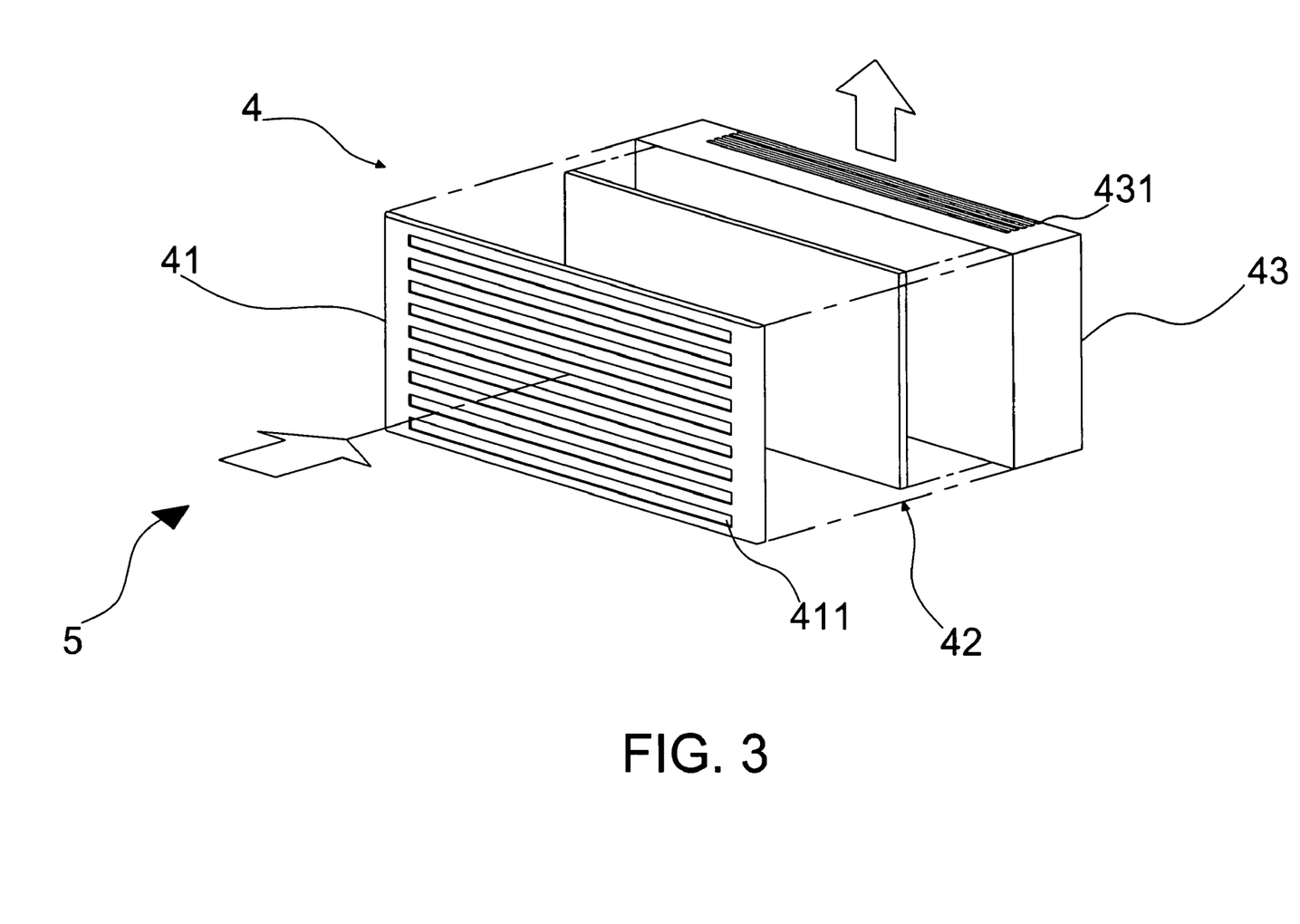
FIG. 3 is a view showing a state of use in an air filter.
Figure 3A:
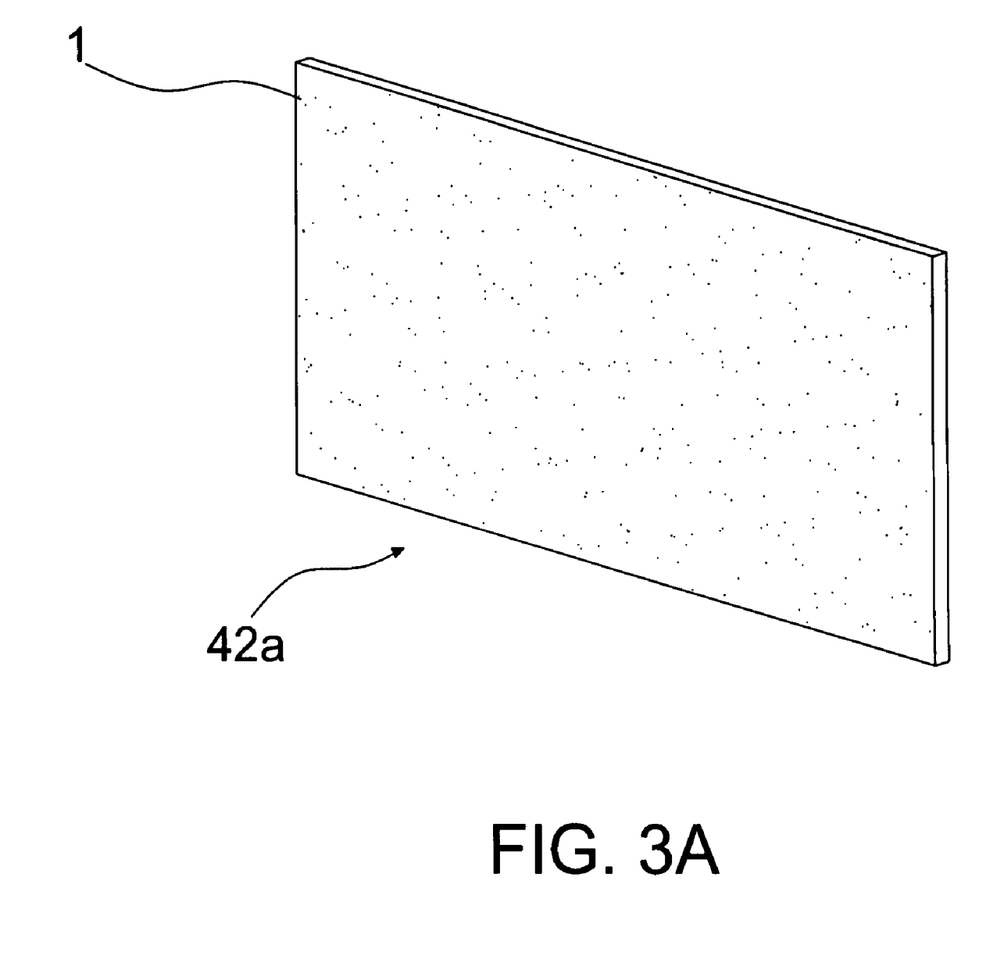
FIG. 3A is a view showing a first preferred embodiment.
Figure 3B:
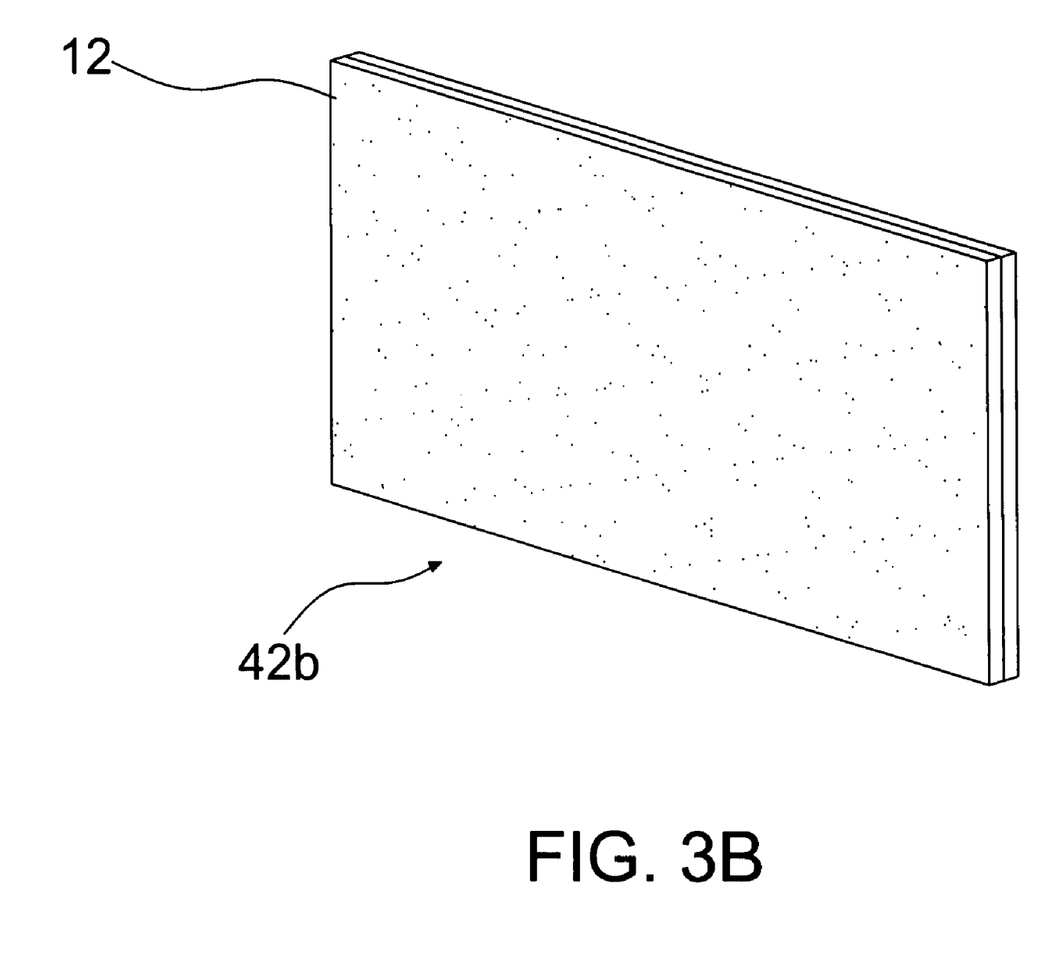
FIG. 3B is a view showing a second preferred embodiment.
Figure 3C:
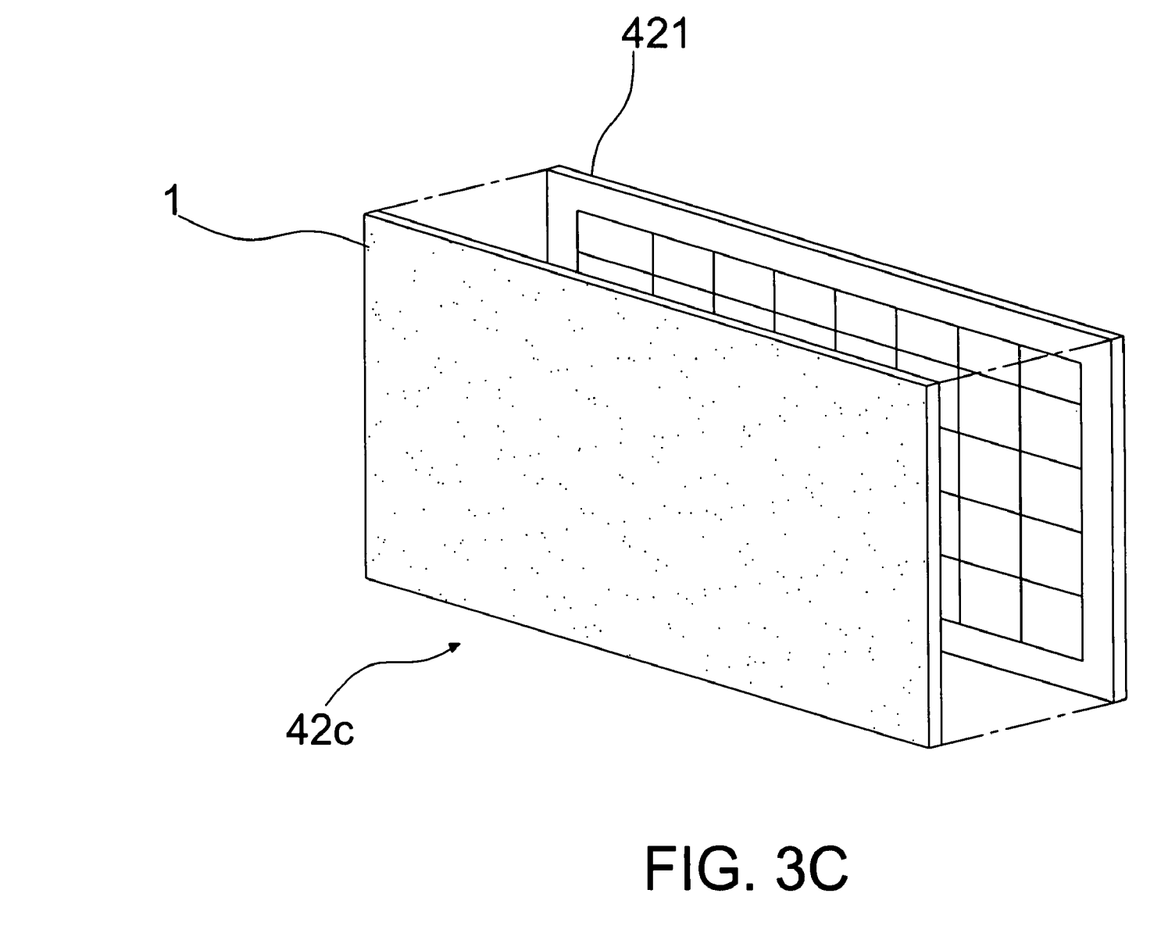
FIG. 3C is a view showing a third preferred embodiment.

Please refer to FIG. 3 till FIG. 3C, which are to a view showing a state of use in an air filter and views showing a first, a second and a third preferred embodiments. As shown in the figures, an air filter 4 comprises a cover plate 41 with an inlet 411; a filter device 42; and a main body 43 with an outlet 431. A first and a third preferred embodiment are applied to the filter device 42 of the air filter 4. In the first preferred embodiment, the filter device 42a is a layer of a magneto-rubber filter 1 with a multi-pores structure; in the second preferred embodiment, the filter device 42b comprises double layers of magneto-rubber filters 12 with a multi-pores structure; and, in the third preferred embodiment, the filter device 42c is a layer of a magneto-rubber filter 1 with a multi-pores structure while it is stacked with at least one filter screen 421. In the third preferred embodiment, the filter screen 421 is a dust exhaustion filter, a high efficiency particulate air filter, an active-carbon filter, a nanometer-photocatalyst filter or any other filter screen. When using the air filter 4, an air 5 having dust, iron filings and floating particles is absorbed from the inlet 411 of the cover plate 41 and is passed through the filter device 42a, 42b, 42c to be filtered. In the end, the air 5 is exhausted out of the outlet 431 of the main body 43. The filter devices of the first and the second preferred embodiments attract metal particles (e.g. iron filings) having sizes more than 0.01 μm. The filter device 42c of the third preferred embodiment selects a mesh size for the filter screen 421 is according to actual requirements. Because the filter screen 421 is stacked with a magneto-rubber filter 1 with a multi-pores structure, non-metal particles (such as dust, smoke ash and floating particles) are filtered out and metal particles) are filtered out and are attracted, where the metal particles and the non-metal particles have a size bigger than 0.01 μm. Hence, the present invention can be applied to a filtering system of an air-conditioner or any other filtering system.

Figure 4:
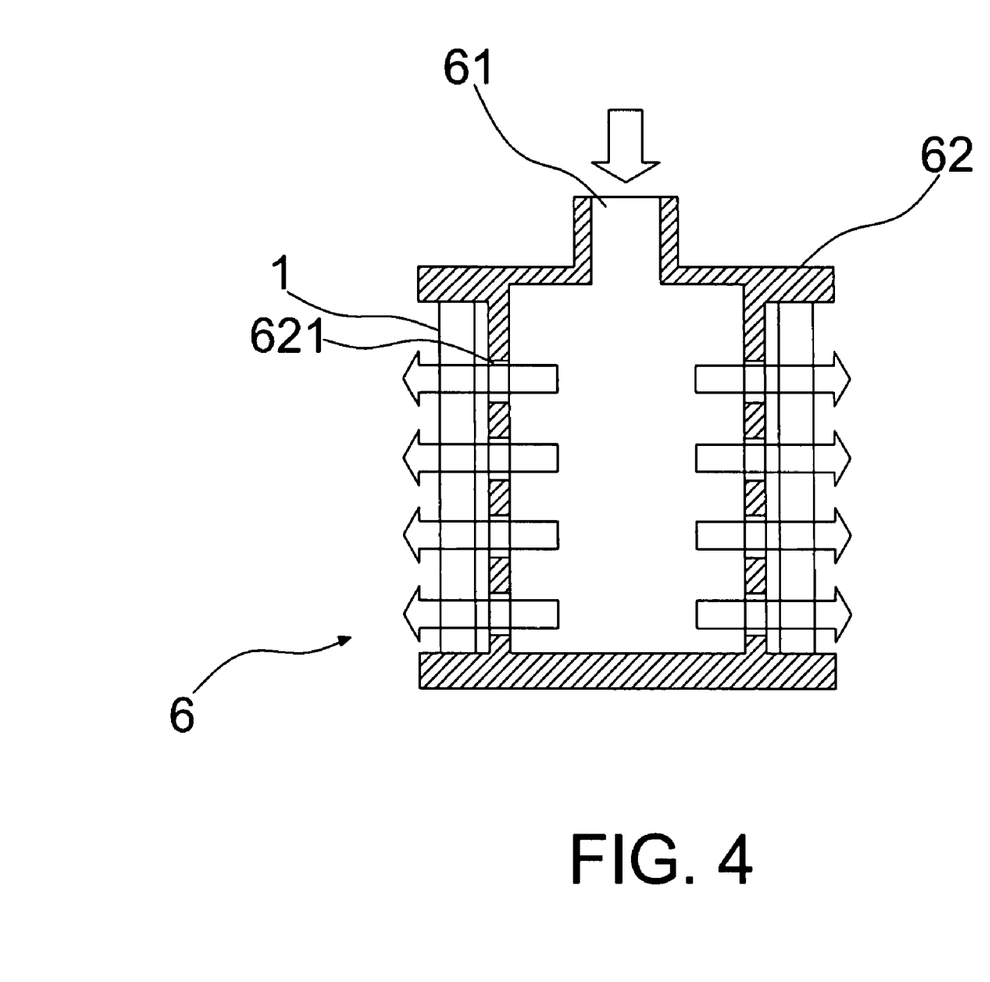
FIG. 4 is a view showing a state of use of a fourth preferred embodiment.

Please refer to FIG. 4, which is a view showing a state of use of a fourth preferred embodiment. As shown in FIG. 4, the present invention is a layer of a magneto-rubber filter having a multi-pores structure, which is applied to an engine oil filter 6. The engine oil filter 6 comprises an engine oil inlet 61. An 'H'-type hollow shell 62 and a magneto-rubber filter 1 surrounding the shell 62. An end corresponding to the engine oil inlet 61 is closed. A plurality of holes 621 are deposed on the shell 62. When using the engine oil filter 6 with the magneto-rubber filter 1 having a multi-pores structure, an oil is entered from the engine oil inlet 61 into the shell 62. Then the oil is entered from the holes 621 of the shell 62 into the magneto-rubber filter 1 with the multi-pores structure to filter out metal and non-metal particles of iron filings and impurities in the oil. Hence, an oil with no iron filings and impurities is obtained. In the fourth preferred embodiment, only a layer of a magneto-rubber filter 1 is applied; yet double layers of magneto-rubber filters or a layer of a magneto-rubber filter with filter screens can be applied to enhance filtering ability. The present invention can be also applied to a hydraulic transmission system, a water-quality recurring filter system, etc.

To sum up, the present invention is a device having a multi-pores magneto-rubber filter, where metal particles are filtered out using magnetism with a simple and easily assembled structure.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A device having a multi-pores magneto-rubber filter, the multi-pores magnetic-rubber filter comprising:
   at least one or more layers of magnetic rubber each layer having a plurality of magnetic filtering holes,
   wherein said magnetic rubber is fabricated by mixing and pressing a polymer and a magnetic iron powder.

2. The device according to claim 1, wherein said polymer is a synthetic rubber selected from a group consisting of a chloroprene, an ethylene propylene diene monomer and a polyurethane resin.

3. The device according to claim 1, wherein said polymer is a compound rubber selected from a group consisting of a styrene butadiene styrene block polymer, a styrene-ethylene-butylene-styrene copolymer compound and a thermoplastic polyolefin.

4. The device according to claim 1, wherein a particle size of said magnetic iron powder is bigger than 0.1 micrometer (μm) in diameter.

5. The device according to claim 1, wherein said device attracts metal particles having particle sizes bigger than 0.01 μm in diameter.

6. The device according to claim 1, wherein said magneto-rubber filter comprises a plurality of stacked layers of magnetic rubber.

7. The device according to claim 6, wherein said magneto-rubber filter comprises a plurality of layers of stacked magnetic rubber, said magnetic filtering holes of the plurality of layers being arranged in an arrangement selected from the group consisting of a coherent arrangement and an incoherent arrangement.

8. The device according to claim 1, wherein said device comprises a single layer of said magneto-rubber filter having one layer of magnetic rubber and a plurality of filter screens being stacked together.

9. The device according to claim 8, wherein said filter screens are selected from the group consisting of a dust exhaustion filter screen, a high efficiency particulate air filter screen, an active-carbon filter screen, and a nanometer-photocatalyst filter screen.

* * * * *